(12) United States Patent
Cintron et al.

(10) Patent No.: US 8,223,123 B1
(45) Date of Patent: Jul. 17, 2012

(54) HARDWARE ACCELERATED CARET RENDERING

(75) Inventors: Rafael V. Cintron, Kirkland, WA (US); Richard K. James, Redmond, WA (US); Benjamin C. Constable, Redmond, WA (US); Cenk Ergan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/163,510

(22) Filed: Jun. 17, 2011

(30) Foreign Application Priority Data

Jun. 2, 2011 (CA) ...................................... 2741743

(51) Int. Cl.
*G06F 3/033* (2006.01)
*G09G 5/08* (2006.01)
(52) U.S. Cl. ........................................ 345/160; 345/520
(58) Field of Classification Search .................. 345/160, 345/520
See application file for complete search history.

(56) References Cited

U.S. PATENT DOCUMENTS

| | | | |
|---|---|---|---|
| 6,825,844 B2 | 11/2004 | Hill et al. | |
| 2007/0294644 A1* | 12/2007 | Yost | 715/856 |
| 2009/0125801 A1 | 5/2009 | Algreatly | |
| 2009/0307623 A1 | 12/2009 | Agarawala et al. | |

OTHER PUBLICATIONS

"Foreign Notice of Allowance", Canadian Application No. 2741743, (Dec. 6, 2011),1 page.
Dowty, et al., "GPU virtualization on VMware's hosted I/O architecture", Retrieved at << http://graphics.stanford.edu/~yoel/notes/gpu-osr.pdf >>, ACM SIGOPS Operating Systems Review, vol. 43, No. 3, Jul. 2009, pp. 10.
"Accelerated graphics driver example", Retrieved at << http://doc.troll.no/master-snapshot/qws-svgalib.html >>, Retrieved Date: Feb. 28, 2011, pp. 11.
"Windows confidential the case of the disappearing cursor", Retrieved at << http://technet.microsoft.com/en-us/library/2009.02.windowsconfidential.aspx >>, Retrieved Date: Feb. 28, 2011, pp. 2.
"Resolving slowdown/graphical glitche", Retrieved at << http://www.gog.com/en/forum/planescape_torment/resolving_slow-down_graphical_glitches/page1 >>, Retrieved Date: Feb. 28, 2011, pp. 4.
"Foreign Office Action", Canadian Application No. 2741743, (Aug. 31, 2011), 2 pages.

* cited by examiner

*Primary Examiner* — Jacinta M Crawford
(74) *Attorney, Agent, or Firm* — Wolfe-SBMC (57) ABSTRACT

Techniques for hardware accelerated caret rendering are described in which a system based caret is emulated using hardware acceleration technology. The hardware accelerated caret can be rendered using dedicated graphics processing hardware to look and feel like a system caret. This can involve using pixel shaders to produce the hardware accelerated caret and a employing a back-up texture to remove the caret after it is drawn and cause the caret to blink. In addition, rendering of the caret can be coordinated with other animations and/or other presentations of a frame buffer to piggy back drawing of the caret onto other drawing operations. This can reduce the number of times the frame buffer is presented and therefore improve performance.

18 Claims, 5 Drawing Sheets

HARDWARE ACCELERATED CARET RENDERING

PRIORITY CLAIM

This application claims priority under 35 U.S.C. §119 to Canadian Patent Application Serial No. 2,741,743 filed in Canada on Jun. 2, 2011 and titled "Hardware Accelerated Caret Rendering," the disclosure of which is incorporated by reference in its entirety herein.

BACKGROUND

A blinking cursor for text input is referred to as a caret. A caret provides a user with a visual indication of a location in which they are currently typing within a document or user interface. Traditionally, a caret is implemented via operating system (OS) functionality of a computing device that relies upon a central processing unit (CPU) of the device. This OS rendering approach, however, is incompatible with hardware accelerated graphics that make use of dedicated graphics processing hardware to perform rendering. It can be complex and costly in terms of resource usage and time to render a caret using traditional techniques and synchronize presentation of the caret in a user interface along with hardware accelerated graphics produced using dedicated graphics processing hardware.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques for hardware accelerated caret rendering are described in which a system based caret is emulated using hardware acceleration technology. The hardware accelerated caret can be rendered using dedicated graphics processing hardware to look and feel like a system caret. This can involve using pixel shaders to produce the hardware accelerated caret and a employing a back-up texture to remove the caret after it is drawn, thus causing the caret to blink. In addition, rendering of the caret can be coordinated with other animations and/or other presentations of a frame buffer to "piggy back" drawing of the caret onto other drawing operations. This can reduce the number of times the frame buffer is presented and therefore improve performance.

BRIEF DESCRIPTION OF THE DRAWINGS

The same numbers are used throughout the drawings to reference like features.

DETAILED DESCRIPTION

Overview

Techniques for hardware accelerated caret rendering are described in which a system based caret is emulated using hardware acceleration technology. The hardware accelerated caret can be rendered using dedicated graphics processing hardware to look and feel like a system caret. This can involve using pixel shaders to produce the hardware accelerated caret and a employing a back-up texture to remove the caret after it is drawn and cause the caret to blink. In addition, rendering of the caret can be coordinated with other animations and/or other presentations of a frame buffer to "piggy back" drawing of the caret onto other drawing operations. This can reduce the number of times the frame buffer is presented and therefore improve performance.

In the discussion that follows, a section titled "Operating Environment" is provided and describes one environment in which one or more embodiments can be employed. Following this, a section titled "Hardware Accelerated Caret Rendering Techniques" describes example techniques and methods in accordance with one or more embodiments. Next, a section entitled "Example Methods" describes example methods in accordance with one or more embodiments. This section includes several subsections that describe example implementation details regarding "Caret Rendering" and "Caret Piggy-Backing." Last, a section titled "Example System" describes example computing systems and devices that can be utilized to implement one or more embodiments.

Operating Environment

Figure 1:
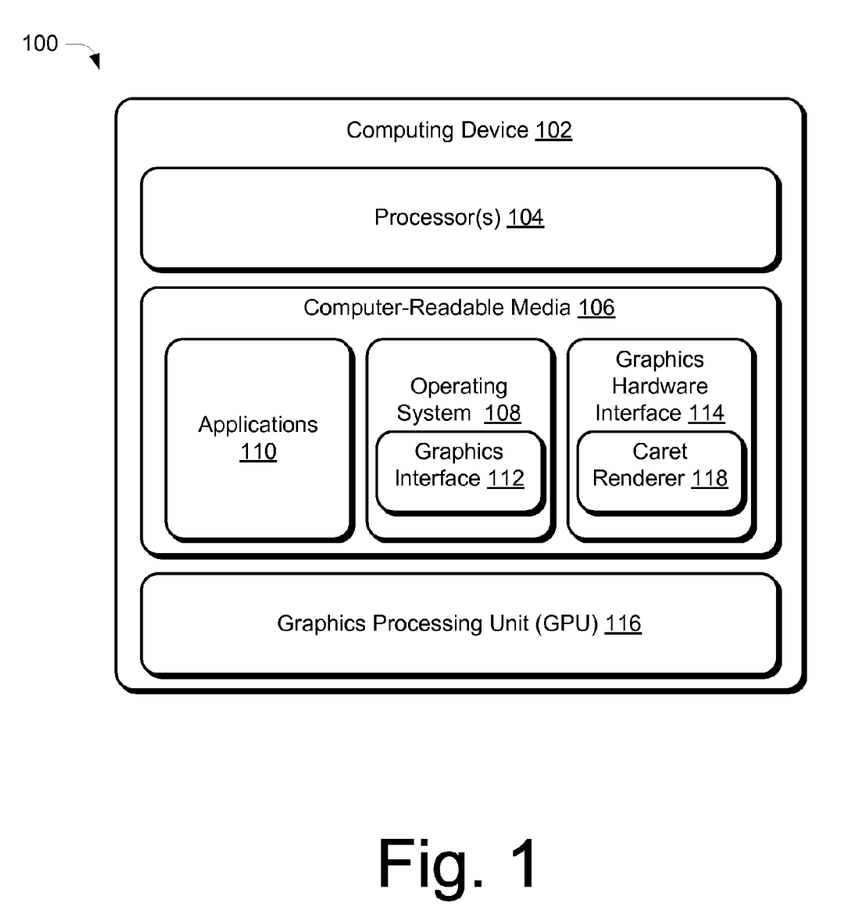
FIG. 1 illustrates an operating environment in which various principles described herein can be employed in accordance with one or more embodiments.

FIG. 1 illustrates an operating environment in accordance with one or more embodiments, generally at 100. The environment 100 includes a computing device 102 having one or more processors 104, one or more computer-readable media 106, an operating system 108, and one or more applications 110 that reside on the computer-readable media and which are executable by the processor(s). The one or more processors 104 may retrieve and execute computer-program instructions from applications 110 to provide a wide range of functionality to the computing device 102, including but not limited to office productivity, email, media management, printing, networking, web-browsing, and so forth. A variety of data and program files related to the applications 110 can also be included, examples of which include office documents, multimedia files, emails, data files, web pages, user profile and/or preference data, and so forth.

The computing device 102 can be embodied as any suitable computing system and/or device such as, by way of example and not limitation, a desktop computer, a portable computer, as tablet or slate computer, a handheld computer such as a personal digital assistant (PDA), a cell phone, a set-top box, and the like. One example of a computing system that can represent various systems and/or devices including the computing device 102 is shown and described below in FIG. 5.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 5.

The operating system 108 also includes a graphics interface 112 that provides graphics rendering functionality integrated with the operating system 108. The graphics interface 112 can be implemented as a core operating system component that directs graphics rendering performed through a central processing unit (CPU), such as the processors 104. The graphics interface 112 can also provide a system caret for text input (e.g., a blinking text input cursor) that can be used by various applications 110. Since the system is provided through the operating system 108, the system caret can be considered to be native functionality of the operating system 108. One example of a suitable graphics interface 112 that is provided as a core component of an operating system is Graphics Device Interface (GDI) by Microsoft™.

The computing device 102 further includes a graphics hardware interface 114 that resides on the computer-readable media and is also executable by the processor(s). The graphics hardware interface 114 provides an interface that can direct operation of a graphics processing unit (GPU) 116 of the computing device. Direct X by Microsoft™ is one example of a suitable graphics hardware interface 114 that can be employed to operate various different kinds of GPUs. The GPU 116 is a hardware component of the computing device that is dedicated to graphics processing. Functionality provided by the GPU 116 may include controlling aspects of resolution, pixel shading operations, color depth, texture mapping, 3D rendering, and other tasks associated with rendering user interfaces and images for applications. This can include processing tasks such as polygon drawing, bitmap transfers and painting, window resizing and repositioning, line drawing, font scaling, and so forth. The GPU 116 may be capable of handling these processing tasks in hardware at greater speeds than software (e.g., the graphics interface 112) that is executed on the processor(s) 104. Thus, the dedicated graphics processing capability of the GPU 116 can accelerate graphics processing, reduce the workload of the processor(s) 104, and free up system resources for other tasks.

In one or more embodiments, GPU 116 may be operated under the influence of the graphics hardware interface 114 to perform the various processing functions. For instance, graphics hardware interface 114 may be configured to provide instructions to direct the operation of the GPU 116, including processing tasks involved in techniques for hardware accelerated caret rendering. In particular, the graphics hardware interface 114 can include a caret renderer 118 configured to render a caret using the GPU 116 that emulates a system caret that is provided via the operating system 108. In one or more embodiments, this can involve invoking pixel shaders to produce the hardware accelerated caret and generating a back-up texture used to remove the caret after it is drawn and cause the caret to blink. The caret renderer 118 can also coordinate drawing of the hardware accelerated caret with other drawing operations performed using the graphics hardware interface 114 and/or GPU 116

Having described an example operating environment, consider now example techniques for hardware accelerated caret rendering in accordance with one or more embodiments.

Hardware Accelerated Caret Rendering Techniques

Broadly speaking, a hardware accelerated caret can be created to emulate the look and feel of a system caret that is provided through native functionality of an operating system. This can occur in any suitably way using capabilities of dedicated graphics processing technology of a computing device. In at least some embodiments, a hardware accelerated caret can be produced under the influence of a caret renderer 118 that directs operation of a graphics processing unit 116. Once created, a hardware accelerated caret can be presented in coordination with other graphics that are presented for display. The caret can be presented, for example, within an application window of an application to facilitate text input. To do so, the caret renderer 118 can operate to control the presentation of the caret to piggy-back upon presentations of other graphics (e.g., from a frame buffer) whenever possible.

Figure 2:
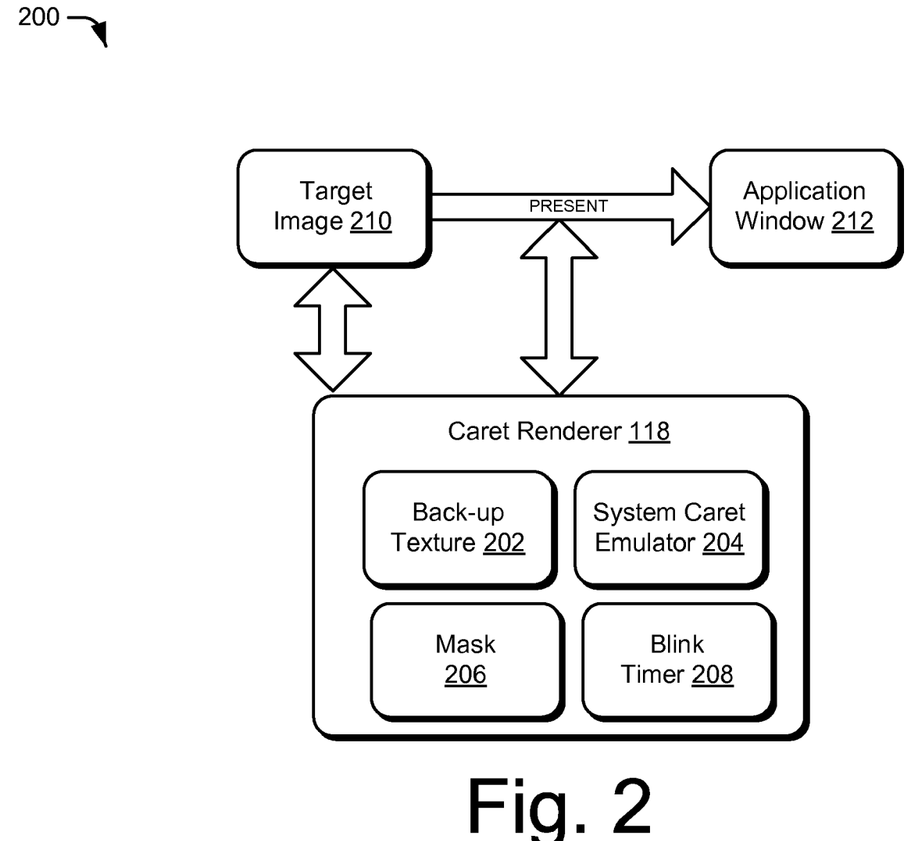
FIG. 2 is a diagram showing components of an example caret renderer in accordance with one or more embodiments.

A caret renderer 118 can be configured in various ways to implement the hardware accelerated caret rendering techniques described above and below. One particular example implementation of a caret renderer 118 is shown in FIG. 2, generally at 200. FIG. 2 also represents interactions of the caret renderer 118 that can occur to implement a hardware accelerated caret. The example caret renderer 118 of FIG. 2 is depicted as including various sub-modules that represent logical divisions of the functionality that is represented by the caret renderer 118. Naturally, any of the example modules and corresponding functionality described herein can be further divided or can be combined in various ways without departing from the spirit and scope of the described techniques.

In the depicted example, the caret renderer 118 includes a back-up texture 202, a system caret emulator 204, a mask 206, and a blink timer 208. The back-up texture 202 can be created to provide back-up of an area of an image under a target location for the caret. For example, the pixels within the area can be saved to the back-up texture 202 so the image can be restored after the caret is drawn.

The system caret emulator 204 is an engine that emulates the behavior of the system caret. The system caret emulator 204 can determine how the system caret behaves and/or appears in different circumstances. This can include determining attributes for the caret such as status, blinking rate, width, size, movement, position, and so forth. The system caret emulator 204 can supply appropriate timing, drawing, and/or visibility information related to the system caret to the caret renderer 118. This enables the caret renderer 118 to closely reproduce these aspects so that the hardware accelerated caret looks and feels like the system caret (e.g., emulates the behavior of the system caret).

In at least some embodiments, a mask 206 can also be applied by the caret renderer 118 to generate a caret having a specified shape that corresponds to the mask. This can be used to create atypically shaped carets that are employed with some keyboard/device languages. The blink timer 208 operates to control the timing of when the caret is displayed. Further, the caret renderer 118 can operate to generate a caret and paint the caret to a target image 210, such as painting the caret to a frame buffer for a user interface of an application 110. Then, at appropriate times determined based in part upon the blink timer 208, the caret renderer 118 can initiate present operations to present the contents of the frame buffer, including the caret and other graphics, to an application window 212.

In addition to drawing/presenting the hardware accelerated caret, the caret renderer 118 can operate to update state information for a system caret to match state information for the hardware accelerated caret. State information can describe properties of the caret such as location, state (visible or hidden), color, blink rate, and so forth. One way the updating can occur is by making calls to the graphics interface 112 to convey information to set the state for the system caret. The updating of the system caret state is conducted because various other applications may rely on this information. For instance, applications can be configured to query the location and/or state of the system caret from the graphics interface 112 for various reasons that are not necessarily related to drawing functions. One example of such an application is an accessibility tool that uses the system caret location to implement accessibility features. Thus, even though the system caret is not actually being drawn, the caret renderer 118 can still update the state information for the system caret to maintain compatibility with application designed to uses this information. In particular, the caret renderer 118 sets the state of the system caret to match what is actually occurring for the hardware accelerated caret that is drawn.

Further, controlling the present time for the hardware accelerated caret as described above and below can assist in reducing or eliminating flicker that can be caused when many different components or applications attempt to update the caret at the same time. In the case of a system caret, conflicting calls to hide and show the caret may cause flicker due to the multiple calls. For the hardware accelerated caret, though, the present time is managed. Thus, when too many sources simultaneously make calls to change the hardware accelerated caret, at least some of the calls can be ignored to prevent flicker from occurring.

Details of these and other aspects of hardware caret rendering techniques are described in the following example methods.

Example Methods

The following section provides a discussion of flow diagrams that describe techniques for hardware accelerated caret rendering that can be implemented in accordance with one or more embodiments. In the course of describing the example methods, a number of subsections are provided that describe example implementation details for various aspects of hardware accelerated caret rendering techniques. The example methods depicted can be implemented in connection with any suitable hardware, software, firmware, or combination thereof. In at least some embodiments, the methods can be implemented by way of a suitability configured computing device, such as the example computing device 102 of FIG. 1 that includes or otherwise makes use of a caret renderer 118.

Figure 3:
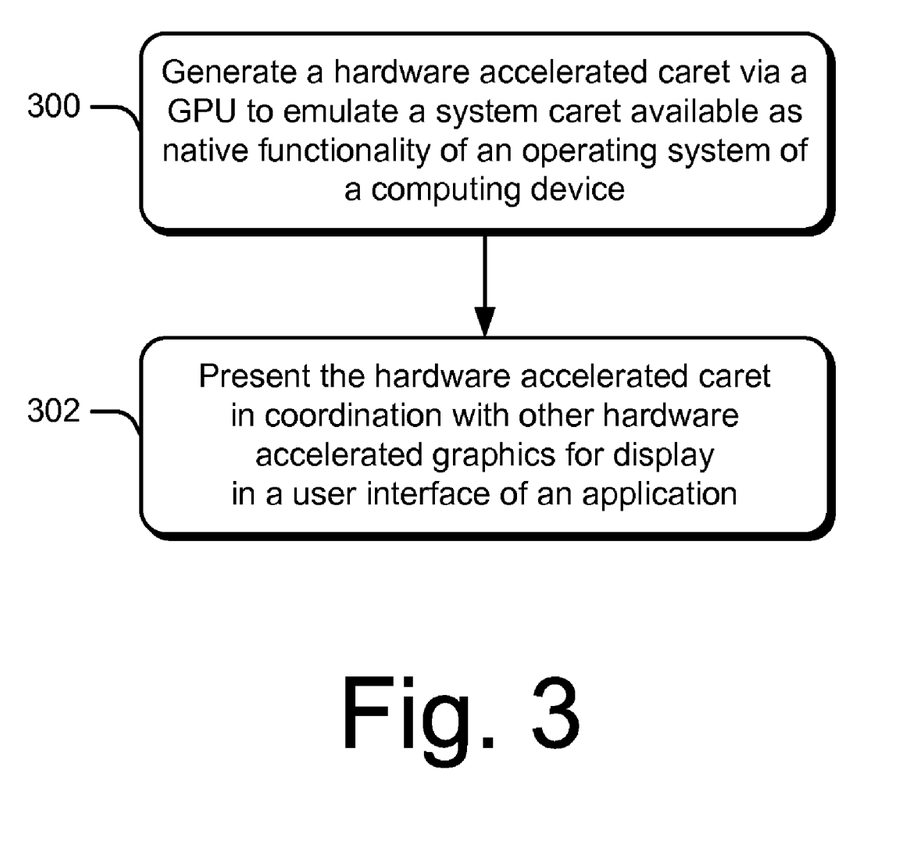
FIG. 3 is a flow diagram that describes steps of an example method in accordance with one or more embodiments.

In particular, FIG. 3 depicts an example method in which a hardware accelerated caret that emulates a system caret is generated. Step 300 generates a hardware accelerated caret via a graphics processing unit (GPU) to emulate a system caret available as native functionality of an operating system of a computing device. For example, a graphic hardware interface 114 of a device can direct operation of a graphics processing unit 116 to produce a hardware accelerated caret. To do so, the graphic hardware interface 114 can include a caret renderer 118 that operates as described above and below. The hardware accelerated caret can be created in any suitable way through various dedicated graphics processing components, capabilities, and pipelines associated with the graphics processing unit 116. The caret renderer can be configured to produce the caret in a manner that emulates the look, feel, and/or behavior of a system caret that originates from a graphics interface 112 of an operating system 108. Further details regarding example techniques that can be employed to generate a hardware accelerated caret are discussed in relation to FIG. 4 below in a section titled "Caret Rendering."

Step 302 presents the hardware accelerated caret in coordination with other hardware accelerated graphics for display in a user interface of an application. For instance, the caret renderer 118 can also operate to coordinate output of the caret for display. In a least some embodiments, a present operation to render the caret to an application window can be coordinated with rendering other hardware accelerated graphics. This can include piggy-backing presentation of the caret with other presentations of hardware accelerated graphics when appropriate. In general, hardware accelerated graphics created through a GPU are painted to a frame buffer before being presented for display. The frame buffer can then be presented asynchronously to output corresponding frames as appropriate. This asynchronous approach enables the caret renderer 118 to intervene in existing present operations to control output of a hardware accelerated caret. The caret renderer 118 can also delay presentation of the caret to coordinate with other graphics when appropriate. Further details regarding example techniques that can be employed to coordinate a hardware accelerated caret with presentation of other graphics are also discussed in relation to FIG. 4 below in a section titled "Caret Piggy Backing."

Caret Rendering

Figure 4:
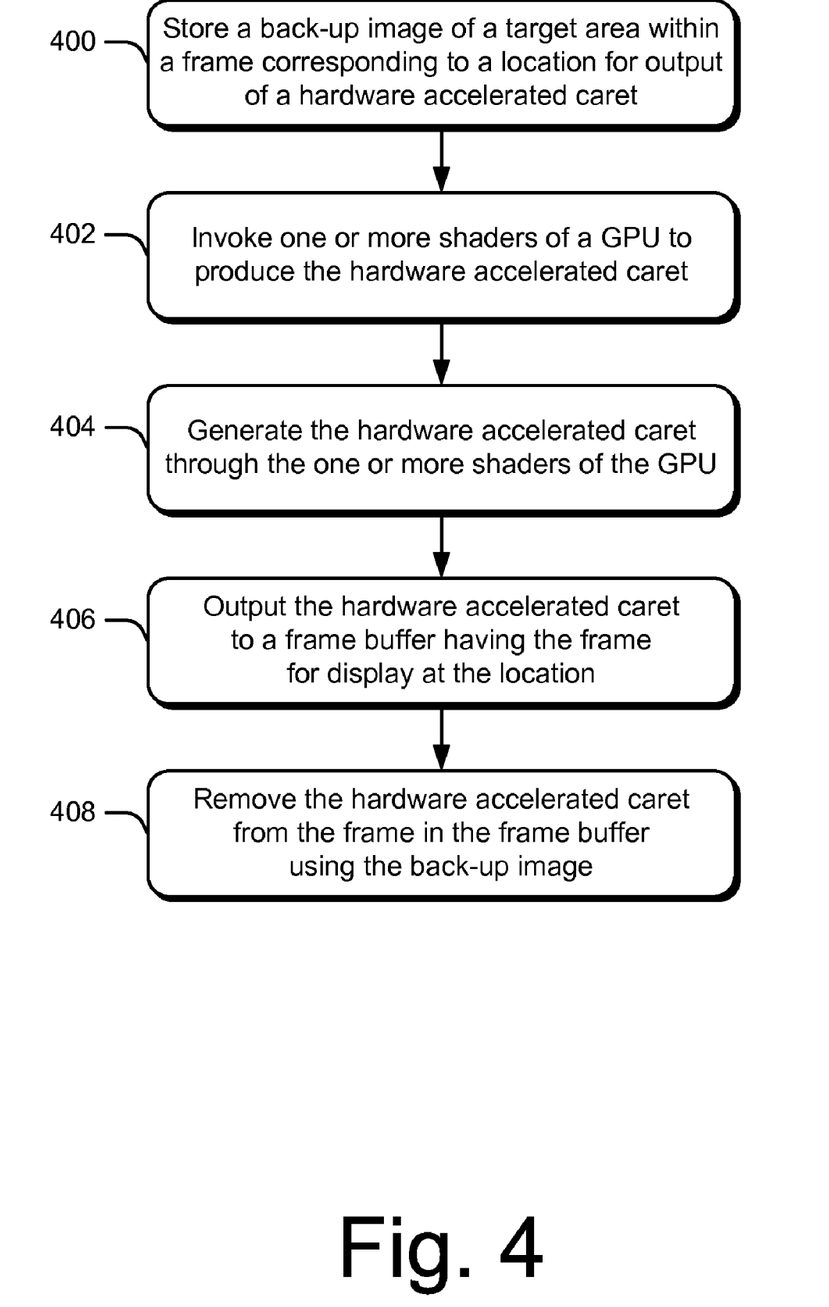
FIG. 4 is a flow diagram that describes steps of another example method in accordance with one or more embodiments.

As mentioned above, a hardware accelerated caret that emulates a system caret can be created in various ways. In this section, some example implementation details regarding techniques that can be employed to render and present a suitable hardware accelerated caret are described in relation to an example method depicted in FIG. 4. In particular, FIG. 4 depicts an example method in which a hardware accelerated caret is generated using dedicated graphics processing components.

Step 400 stores a back-up image of a target area within a frame corresponding to a location for output of a hardware accelerated caret. This involves saving the pixels of the target frame under the target area where the caret is to appear so that the image can be restored at a later point. This enables the caret to be quickly rendered and removed to create a blinking effect or to otherwise selectively show and hide the caret as appropriate. Storage of the back-up image can occur in any suitable way. In one approach, a back-up texture can be created to store the back-up image. The caret renderer 118 can operate to write pixels within a defined area to the back-up texture. The target area can be configured as a relatively small area that corresponds to a location in which the caret is to be placed. Accordingly, the back-up texture can be defined to have a size that matches the target area. The size can be relatively small compared to the frame as a whole. The size for example can roughly match the size of the caret is generated. In other words, the processing to create a caret can be scoped down to the small target area within a frame. Thus, painting the relatively small back-up texture/caret can be accomplished faster and more efficiently than re-rendering the entire frame to selectively show and hide the caret.

Step 402 invokes one or more shaders of a graphics processing unit (GPU) to produce the hardware accelerated caret and step 404 generates the hardware accelerated caret through the one or more shaders provided as components of the GPU. For instance, caret renderer 118 can operate the graphics processing unit (GPU) to perform processing to generate a hardware accelerated caret. In one approach, the processing can occur by way of a processing pipeline that includes one or more shaders to produce graphics and effects. The shaders can create the caret by combining multiple polygon shapes. For instance, as rectangular caret can be formed by combining two triangles. The one or more shaders can also be implemented to designate colors for the polygon shapes that are created to form the caret. For instance, a color for the caret can be selected based at least in part upon a color of the target area and/or a background color surrounding the target location for the caret.

In at least some embodiments, the one or more shaders used to generate a hardware accelerated caret include at least an invert shader. The invert shader can be configured to render/draw the triangles (or other shapes) used to create a caret and designate the colors for the shapes using color inversion. In operation, the invert shader takes each color channel (red, green, blue in an RGB color space) of the target area and inverts the colors by applying an inversion function. For example, an inversion function of "1−X" can be applied to a source pixel input to the shader to produce an output pixel for the caret having a color (1−R, 1−G, 1−B) relative to the color of the source pixel.

The one or more shaders can operate on a pixel-by-pixel basis to convert pixels for the caret to an appropriate output color in this manner. The source color can be based upon the color within the target area for the caret and/or a background surrounding the target location for the caret. The caret renderer 118 can be configured to determine the source color by sampling the color of target area and/or a background (e.g., sampling the back buffer) and providing the source color as input to the shaders. The shaders then invert the colors for shape based on the provided source color to create a suitable output color for pixels of the caret. Performing color inversion as just described ensures that the caret is visible against the particular color of the background. For instance, against a white background, the caret appears blacks, and vice versa.

The one or more shaders can also include a color blending component configured to apply color blending to create the output color for the caret. In this approach, the source color can be inverted as just described and then a blending operation is applied via the color blending component to combine the inverted color according to blend mode settings. Blend mode settings can include a blend color designated to control/modify the color of the output pixels. This technique can be used to fine tune the output color for the hardware accelerated caret in some situations. In other situations, the inverted color can simply be selected as is for the output color, effectively without blending. This can be accomplished by skipping the blend operation altogether or by using blend mode settings that will not cause the inverted color to change. For instance, appropriate blend mode settings can be designated to simply cause multiplication of the inverted color by a value of 1, which results in the inverted color being used as the output color.

The above techniques enable creation of a simple caret that has generally rectangle shape (e.g., a vertical line). Some other carets can be more complex. For example carets can differ for different keyboard/device language, examples of which include Hebrew and Thai. Further, a more complex shaped caret can optionally be chosen by a developer as a design choice. To accommodate more complex carets, a mask can be applied to produce the desired shape of the caret. For instance, a mask for a caret can be used to designate pixels of a target area to invert and leave alone when the pixels are processed by the shaders. The mask can be configured as a texture (e.g., bit map) that indicates for each pixel of the caret whether the pixel is opaque or transparent. For instance, a value of 1 can indicate that a pixel is opaque or masked and a value of 0 can indicate that the pixel is transparent or unmasked. In general, operations applied using the mask modify the unmasked areas and have no effect on the masked areas.

Thus, the shaders can apply the mask to create a caret having a shape that corresponds to the mask. For instance, the shaders can perform color inversion in accordance with the mask. In particular, the shaders operate using the mask to invert pixels for the caret that are transparent/unmasked (mask=0) and leaves other pixels that are opaque/masked alone (mask=1). The result is a caret having the inverted color in the designated unmasked portions and the source/background color in the masked portions. Thus, a caret having a variety of different shapes can be created using a mask in the manner described.

Step 406 outputs the hardware accelerated caret to a frame buffer having the frame for display at the location. To create images for display, a variety of hardware accelerated graphics can be rendered using a graphics processing unit (GPU). To prepare the graphics for display, the graphics are first painted to a frame buffer by marking an area to paint and then filling in the marked area with corresponding graphics to produce the frame/image. Thereafter, a present operation is performed to send the contents of frame buffer to an application window and display the resulting frame. In this manner, painting and presenting of the hardware accelerated graphics can occur asynchronously. Graphics can be added into a frame (e.g., painted) right up until the time the frame is presented.

Accordingly, the caret that is generated as described above can be painted to the frame buffer at appropriate times. To do so, the caret renderer 118 can intervene to draw the caret into a frame before the frame is presented to an application window for display. In at least some embodiments, the caret is drawn to the frame just before the frame is displayed. This can occur whenever the caret renderer 118 determines to show the caret in a frame. As mentioned, the caret renderer 118 can make use of a blink timer 208 to control the timing of when the caret is displayed and hidden. In some cases, the caret renderer 118 can initiate a present operation specifically to present the caret. Additionally, the caret renderer 118 can detect and coordinate with presentations of other graphics to piggy-back display of the caret on present operations that are initiated to display other graphics. The caret renderer 118 can decide for each individual present operation whether or not to intervene to draw and present the caret. In this way, the caret renderer 118 can take advantage of already existing present operations when they are available. When existing present operations are not available, the caret renderer 118 can initiate present operations on its own. Further details regarding example techniques for caret piggy-backing are described in the following section.

Step 408 removes the hardware accelerated caret from the frame in the frame buffer using the back-up image. In this step, the caret that is painted onto the frame buffer is removed following presentation of the frame. In particular, the back-up texture can be used to paint the saved pixels from the target frame back into the frame buffer. The removal can occur immediately following a present operation that sends the frame having the caret for display. This restores the frame buffer to the state it was in before painting of the caret. Accordingly, the caret operations can be entirely transparent to other applications and standard paint operations that are performed through the graphics hardware interface 114. The next frame can be painted in the frame buffer without awareness of hardware accelerated caret. The caret renderer 118 can then determine whether or not to repaint the caret when the next frame is presented. If the caret renderer 118 chooses not to repaint the caret back into the buffer for the next present, the caret will not be displayed when the next frame is presented. The removal technique just described can be used to selectively show or hide the caret for different frames. This also enables the caret to appear to blink by switching back and forth between presented frames in which the caret is painted and frames that do not include the caret.

Caret Piggy-Backing

Present operations can be relatively time consuming and computationally expensive. Therefore performance of a device can be improved by reducing the number of times present operations occur. With respect to presenting a hardware accelerated caret, this can be accomplished by piggy-backing upon existing present operations. For instance, other screen/display activities such as flash ads, videos, or busy animations in a page can create periods in which numerous present operations are occurring. At such times, it is not necessary for the caret renderer 118 to initiate additional presents to show the caret. Instead, the caret renderer 118 can piggy-back onto the already occurring present operations.

Accordingly, the caret renderer 118 can be configured to enable piggy-backing upon other present operations initiated for frame. The caret renderer 118 can intervene when painting of the frame is occurring. In some embodiments, the caret renderer 118 intervenes and takes control just after other applications/components have completed painting to the frame and/or just before the present operation is set to occur. At this point, the caret renderer 118 can be configured to perform any of the functions related to generating/rendering the caret as described herein including storing back-up information from the frame to a back-up texture, creating the caret through the GPU, painting the caret to the frame, setting timing for the caret blink, and so forth. After rendering the caret, the caret renderer 118 can then return control or otherwise cause the present operation initiated for the frame to occur. After the present operation occurs, the caret renderer 118 uses the back-up texture to remove the caret and restore the frame as described previously.

The caret renderer 118 also controls the timing for the caret and/or piggy-backing in accordance with the blink timer 208. The blink timer 208 can be set to designate times or intervals at which to present the hardware accelerated caret. The caret renderer 118 can make use of the blink timer 208 to understand the last time the caret was presented and the designated timing for blinking of the caret. The caret renderer 118 can also maintain state information for the caret based on the timer that indicates the expected state of the caret as visible or not in the target display. The caret renderer 118 can employ this information to determine when to draw the caret.

To enable the piggy-backing, the caret renderer 118 can be configured to perform monitoring to detect when present operations associated with other hardware accelerated graphics are set to occur. The monitoring enables the caret renderer to determine when existing present operations that can be used for piggy-backing are available or unavailable. When no other presents are available, the caret renderer 118 can initiate present operations at appropriate times to make the caret selectively appear and disappear.

When suitable presents are available, though, a decision can be made for each present regarding whether or not to intervene in the present based upon at least the current state of the caret, timing designated by the blink timer 208, and the time at which existing present operations are set to occur. By monitoring presents, the caret renderer 118 can recognize times of busy animation. At these times, the caret renderer 118 can anticipate that presents to run the animation will occur frequently. When the caret renderer 118 anticipates that a future present will occur within a designated time frame, then the caret renderer 118 can forego initiation of another present and piggy-back on the future present in the manner described herein. Thus, piggy-backing can occur many times for successive presents during times of busy animation. In another example, the caret renderer 118 can identify and select present operations for piggy-backing based on scheduled or predetermined timing for the present operations.

When a suitable present operation for piggy-backing is identified, the caret renderer 118 intervenes between painting of other graphics to the frame buffer and the present operation to perform operations to draw the caret in the frame. During the intervention, the hardware accelerated caret is painted to the frame buffer. The present operation can then occur to send the contents of the frame buffer including the caret for display. After the present, the caret renderer 118 removes the caret and restores the frame buffer using a back-up texture as described above. A decision regarding whether to intervene/piggy-back can be repeated each time the caret is to be painted and for each detected present operation.

In some situations, a present operation may not occur as anticipated. For instance, an animation that was previously running may reach its endpoint, which causes corresponding presents for the animation to stop. To handle such situations, the caret renderer 118 can be configured to implement recovery operations to recover from piggy-backing on a present that did not occur. In particular, even though a piggy-back is planned, the caret renderer 118 continues to run the blink timer 208. If the present does not actually occur within the time frame set by the blink timer 208, the caret renderer 118 can conclude that the busy animation period is over. Accordingly, the caret renderer 118 can initiate a present operation on its own to present the frame buffer and display the caret. In effect, the caret renderer 118 can be configured to skip initiation of its own present if another present occurs (or is anticipated) within the time interval set by the blink timer. However, the caret renderer 118 does not skip its next scheduled present if an anticipated present does not actually occur.

Having considered example techniques for hardware accelerated caret rendering, consider a discussion of an example system in accordance with one or more embodiments.

Example System

Figure 5:
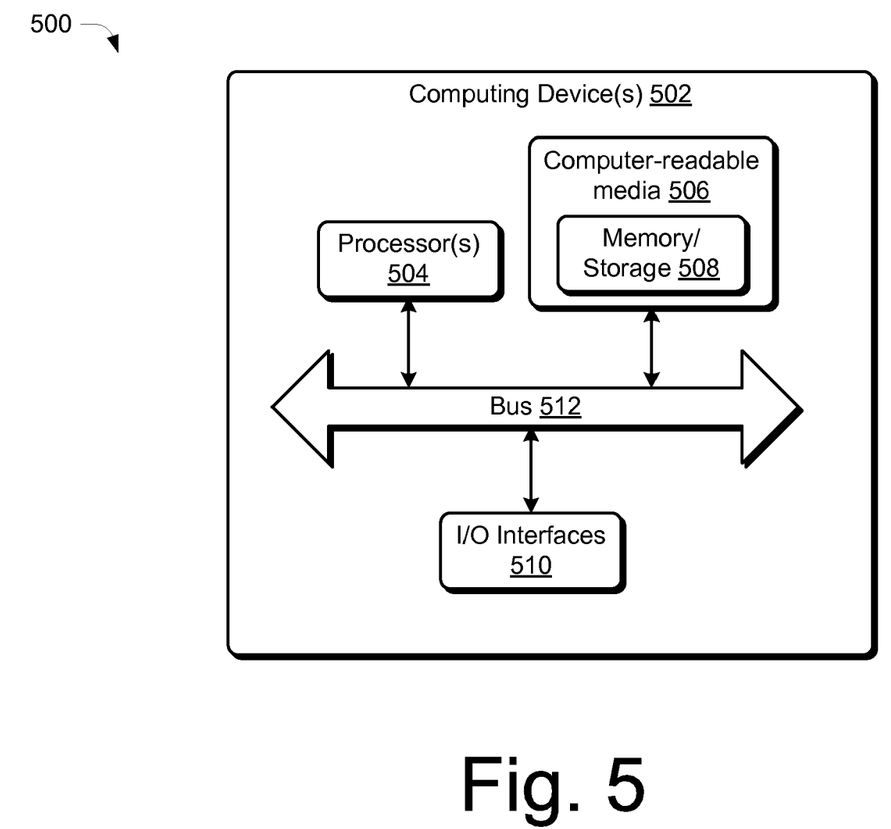
FIG. 5 illustrates an example computing system that can be used to implement one or more embodiments.

FIG. 5 illustrates an example system generally at 500 that includes an example computing device 502 that is representative of one or more such computing systems and/or devices that may implement the various embodiments described above. The computing device 502 may be, for example, a server of a service provider, a device associated with the computing device 102 (e.g., a client device), an on-chip system, and/or any other suitable computing device or computing system.

The example computing device 502 includes one or more processors 504 or processing units, one or more computer-readable media 506 which may include one or more memory and/or storage components 508, one or more input/output (I/O) interfaces 510 for input/output (I/O) devices, and a bus 512 that allows the various components and devices to communicate one to another. Computer-readable media 506 and/or one or more I/O devices may be included as part of, or alternatively may be coupled to, the computing device 502. The bus 512 represents one or more of several types of bus structures, including a memory bus or memory controller, a peripheral bus, an accelerated graphics port, and a processor or local bus using any of a variety of bus architectures. The bus 512 may include wired and/or wireless buses.

The one or more processors 504 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 508 represents memory/storage capacity associated with one or more computer-readable media. The memory/storage component 508 may include volatile media (such as random access memory (RAM)) and/or nonvolatile media (such as read only memory (ROM), Flash memory, optical disks, magnetic disks, and so forth). The memory/storage component 508 may include fixed media (e.g., RAM, ROM, a fixed hard drive, etc.) as well as removable media (e.g., a Flash memory drive, a removable hard drive, an optical disk, and so forth).

Input/output interface(s) 510 allow a user to enter commands and information to computing device 502, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the caret renderer 118, graphics hardware interface 114, operating system 108, applications 110, and other program modules, may be implemented as one or more instructions and/or logic embodied on some form of computer-readable media.

Accordingly, particular modules, functionality, components, and techniques described herein may be implemented in software, hardware, firmware and/or combinations thereof. The computing device 502 may be configured to implement particular instructions and/or functions corresponding to the software and/or hardware modules implemented on computer-readable media. The instructions and/or functions may be executable/operable by one or more articles of manufacture (for example, one or more computing devices 502 and/or processors 504) to implement techniques for hardware accelerated caret rendering, as well as other techniques. Such techniques include, but are not limited to, the example procedures described herein. Thus, computer-readable media may be configured to store or otherwise provide instructions that, when executed by one or more devices described herein, cause various techniques for hardware accelerated caret rendering.

CONCLUSION

Techniques for hardware accelerated caret rendering are described in which a system based caret is emulated using hardware acceleration technology. The hardware accelerated caret can be rendered using dedicated graphics processing hardware to look and feel like a system caret. This can involve using pixel shaders to produce the hardware accelerated caret and a employing a back-up texture to remove the caret after it is drawn and cause the caret to blink. In addition, rendering of the caret can be coordinated with other animations and/or other presentations of a frame buffer to piggy back drawing of the caret onto other drawing operations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   generating a hardware accelerated caret via a dedicated graphics processing unit of a computing device;
   storing in a back-up texture pixels of a target area corresponding to a location within a frame for output of the hardware accelerated caret;
   presenting the hardware accelerated caret in coordination with other hardware accelerated graphics for display in a user interface for an application of the computing device; and
   using the back-up texture to remove the hardware accelerated caret from the frame after the presenting.

2. The computer-implemented method of claim 1, wherein the hardware accelerated caret is configured to emulate behavior of a system caret available as native functionality of an operating system of the computing device.

3. The computer-implemented method of claim 1, wherein the hardware accelerated caret is configured to provide a visual indication of a location within the user interface for text entry.

4. The computer-implemented method of claim 1, wherein generating the hardware accelerated caret comprises invoking one or more shaders of the graphics processing unit to create the caret.

5. The computer-implemented method of claim 1, wherein generating the hardware accelerated caret comprises causing the graphics processing unit to apply a mask to form a shape for the hardware accelerated caret corresponding to the mask.

6. The computer-implemented method of claim 1, wherein generating the hardware accelerated caret comprises invoking the graphics processing unit to perform color inversion upon a target area corresponding to a location within a frame for output of the hardware accelerated caret.

7. The computer-implemented method of claim 1, wherein presenting the hardware accelerated caret comprises piggy-backing upon an existing present operation associated with the other hardware accelerated graphics.

8. The computer-implemented method of claim 1, wherein presenting the hardware accelerated comprises:
   monitoring to determine whether an existing present operation is available to use for presenting the hardware accelerated caret;
   when the existing present operation is available:
      intervening in the existing present operation associated with the other hardware accelerated graphics;
      painting the hardware accelerated caret to a frame in a frame buffer in which the other hardware accelerated graphics are painted; and
      causing the existing present operation to occur to display the contents of the frame buffer in the user interface.

9. The computer-implemented method of claim 8, wherein presenting the hardware accelerated caret comprises:
   when the existing present operation is unavailable:
      painting the hardware accelerated caret to a frame buffer; and
      initiating a present operation specifically to present the hardware accelerated caret.

10. A computing system comprising:
    a graphics processing unit configured to provide dedicated graphics processing functionality for the computing system;
    a caret renderer configured to direct the graphics processing unit to produce a hardware accelerated caret that emulates a system caret; and
    a back-up texture configured to store a back-up image used to remove the hardware accelerated caret from a frame buffer after the hardware accelerated caret is presented for display.

11. The computing system of claim 10, wherein the caret renderer is further configured to present the hardware accelerated caret in coordination with other hardware accelerated graphics for display in a user interface of an application by selectively piggy-backing upon present operations associated with the other hardware accelerated graphics.

12. The computing system of claim 10, further comprising an invert shader provided as a component of the graphics processing unit configured to designate a color for the hardware accelerated caret by inverting a source color corresponding to a target location for the hardware accelerated caret in a frame.

13. The computing system of claim 10, wherein the caret renderer includes:
    a system caret emulator configured to supply timing, drawing, and visibility information related to the system caret to enable the caret renderer to reproduce behaviors of the system caret for the hardware accelerated caret; and
    a blink timer used to control timing for presentation of the hardware accelerated caret.

14. One or more computer-readable storage media storing instructions that, when executed via a computing device, implement an caret renderer for producing a hardware accelerated caret for the computing device, the caret renderer configured to:
    store a back-up image of a target area corresponding to a location within a frame for output of a hardware accelerated caret;
    invoke one or more shaders of a graphics processing unit to produce the hardware accelerated caret;
    output the hardware accelerated caret to a frame buffer having the frame for display at the location; and
    remove the hardware accelerated caret from the frame in frame buffer using the back-up image.

15. One or more computer-readable storage media of claim 14, wherein the one or more shaders comprise an invert shader to render the hardware accelerated caret by combining multiple polygon shapes and performing color inversion upon source pixels in a target location for the hardware accelerated caret.

16. One or more computer-readable storage media of claim 14, wherein the caret renderer is further configured to:
    detect a present operation associated with other hardware accelerated graphics; and
    intervene in the present operation to paint the hardware accelerated caret to the frame buffer before the present operation to coordinate output of the hardware accelerated caret with the detected present operation.

17. One or more computer-readable storage media of claim 14, wherein the caret renderer is further configured to initiate a present operation to output the hardware accelerated caret when an existing present operation associated with other hardware accelerated graphics is not available.

18. One or more computer-readable storage media of claim 14, wherein the caret renderer is further configured to update state information for a system caret to match state information for the hardware accelerated caret.

\* \* \* \* \*